United States Patent

Ray et al.

[11] Patent Number: 6,014,840
[45] Date of Patent: Jan. 18, 2000

[54] HEATED SLIDING WINDOW ASSEMBLY WITH AN ELECTRICALLY CONNECTED SLIDING PANE

[75] Inventors: Gary L. Ray, Cassopolis, Mich.; Raymond S. Butler, Elkhart, Ind.; Dennis J. Buening, Northville, Mich.; Michael D. Kobrehel, Elkhart; Todd E. Cripe, Goshen, both of Ind.; Paul M. Eichenberg, Northville, Mich.; Yasmin W. Eloian, Dearborn, Mich.; Charles A. Deperro, Warren, Mich.; Brian J. Czopek, St. Clair Shores, Mich.; Mary M. Inman, Harrison Township, Mich.

[73] Assignee: Dura Automotive Systems, Inc., Elkhart, Ind.

[21] Appl. No.: 08/998,144

[22] Filed: Dec. 24, 1997

[51] Int. Cl.⁷ .................................................... E05D 15/06
[52] U.S. Cl. ................................ 49/413; 49/360; 49/380; 49/449
[58] Field of Search ............................ 49/380, 404, 413; 219/522, 214, 202, 203, 536, 537

[56] References Cited

U.S. PATENT DOCUMENTS

| | | | |
|---|---|---|---|
| 3,508,361 | 4/1970 | Ryder | 49/70 |
| 3,898,427 | 8/1975 | Levin et al. | |
| 3,911,245 | 10/1975 | O'Shaughnessy | 219/218 |
| 3,964,068 | 6/1976 | Torii et al. | |
| 3,995,142 | 11/1976 | Ciardelli et al. | |
| 4,023,008 | 5/1977 | Durussel | 219/522 |
| 4,065,848 | 1/1978 | Dery . | |
| 4,137,447 | 1/1979 | Boaz . | |
| 4,244,774 | 1/1981 | Dery . | |
| 4,388,522 | 6/1983 | Boaz | 219/522 |
| 4,410,843 | 10/1983 | Sauer et al. | 318/467 |
| 4,415,196 | 11/1983 | Baum et al. | 296/201 |
| 4,450,346 | 5/1984 | Boaz . | |
| 4,458,445 | 7/1984 | Sauer et al. | 49/26 |
| 4,519,443 | 5/1985 | Sutoh et al. . | |
| 4,552,611 | 11/1985 | Dery et al. . | |
| 4,611,849 | 9/1986 | Trenkler | 296/201 |
| 4,883,940 | 11/1989 | Tokarz | 219/203 |
| 5,308,247 | 5/1994 | Dyrdek | 439/34 |
| 5,363,596 | 11/1994 | Kronbetter | 49/495.1 |
| 5,442,880 | 8/1995 | Gipson . | |
| 5,466,911 | 11/1995 | Spagnoli et al. | 219/203 |
| 5,525,401 | 6/1996 | Hirmer . | |
| 5,542,214 | 8/1996 | Buening . | |
| 5,613,323 | 3/1997 | Buening | 49/380 |
| 5,617,675 | 4/1997 | Kobrehel . | |
| 5,716,536 | 2/1998 | Yokoto et al. | 219/219 |
| 5,724,771 | 3/1998 | Gipson | 49/449 |

Primary Examiner—Daniel P. Stodola
Assistant Examiner—Gregory J. Strimbu
Attorney, Agent, or Firm—Banner & Witcoff, Ltd.

[57] ABSTRACT

A heated sliding window assembly comprising a fixed portion comprising a circumferential frame and a fixed pane attached to the circumferential frame, with the fixed pane having an electrically conductive heating grid. A sliding pane is slidable within the circumferential frame between an open position and a closed position, and the sliding pane has an electrically conductive heating grid. A first conductive element is mounted on the fixed portion and a second conductive element is mounted on the sliding pane. The first and second conductive elements are routed through a latch assembly, and are electrically connected together when the sliding pane is in the closed position. To connect the heating grid of the sliding pane to the heating grid of a second fixed pane, third and fourth conductive elements are employed, either routed through the same latch assembly as the above mentioned first and second conductive elements or mounted at an end of the sliding pane remote from the latch assembly. The conductive elements may make wiping contact with one another to enhance electrical contact. In certain preferred embodiments the latch assembly has a cam which pivots as a latch lever is pivoted to an unlatching position, urging the conductive elements out of electrical contact.

22 Claims, 5 Drawing Sheets

HEATED SLIDING WINDOW ASSEMBLY WITH AN ELECTRICALLY CONNECTED SLIDING PANE

FIELD OF THE INVENTION

The present invention generally relates to improved sliding window assemblies incorporating heating elements on the sliding pane, and more particularly to sliding window assemblies suitable for use in motor vehicles and the like.

BACKGROUND OF THE INVENTION

Fixed window assemblies, particularly rear windows in motor vehicles, are known to have a heating grid mounted on one surface of a fixed pane, the heating grid comprising a series of heating elements and bus bars electrically connecting the heating elements. A terminal is mounted on each bus bar and connects to a power source such as a battery of the motor vehicle. Resistance to the current flowing through the heating elements generates heat which warms the fixed pane and removes ice or log. However, such fixed window assemblies do not have a provision for access to the outside to allow air to circulate within the motor vehicle.

Sliding window assemblies typically have one or more sliding panes and one or more fixed panes. The sliding pane allows access to the outside of the motor vehicle. Recently, numerous substantial improvements have been made in the art of sliding window assemblies, particularly sliding window modules used in motor vehicles. See for example, commonly owned U.S. Pat. No. 5,442,880 to Gipson et al, (disclosing an innovative sliding window assembly where a plastic frame and a backplate cooperate to define a sliding pane run channel) and 5,542,214 and 5,613,323 to Buening (disclosing several significant improvements in sliding window assemblies directed toward power and flush glass sliding modules). However, where the sliding window assembly is subjected to fog and frost, particularly when positioned in the rear of the motor vehicle, it would be desirable to be able to remove the frost without resorting to ice scrapers or other mechanical techniques. This is especially true for extended cab pick-up trucks, as the rear sliding window assemblies in extended cabs are not conveniently accessible from the driver's seat. Extended cab pick-up trucks have over the past few years taken on a dramatically increasing share of the market for trucks.

Therefore it is an object of the present invention to provide a sliding window assembly with superior design having heating elements for clearing fog or frost activated for example simply by a switch, mounted, for example, on the dashboard of a motor vehicle. It is an additional object of the present invention to provide a heated sliding window assembly in which the sliding pane has heating elements which are electrically connected to fixed pane heating elements. It is an additional object, at least in certain preferred embodiments, to provide a heated sliding window module of reduced cost and complexity while enhancing manufacturability. It is another object of the present invention to provide a heated sliding window module that is highly reliable in operation.

SUMMARY OF THE INVENTION

In accordance with a first aspect, a heated sliding window assembly has a fixed portion comprising a circumferential frame and at least one fixed pane attached to the frame, with the pane having an electrically conductive heating grid. A sliding pane is slidable within the circumferential frame between an open position and a closed position.

The sliding pane has an electrically conductive heating grid. Each electrically conductive heating grid receives electricity from a power source. The electricity generates heat which warms the pane to remove ice or fog. A first conductive element is mounted on the fixed portion, either to the circumferential frame or to the fixed pane, and is electrically connected to the fixed pane heating grid. A second conductive element is mounted on the sliding pane and is electrically connected to the sliding pane heating grid. The first and second conductive elements are electrically connected when the sliding pane is in the closed position to electrically power the sliding pane heating grid. Preferably the heating grids of the fixed and sliding panes are connected in series so that the Grids form a closed circuit when the sliding pane is in the closed position. Preferably the conducting elements make self-cleaning wiping contact with one another as the sliding pane slides between the open and closed positions.

It is preferable that the conductive elements be generally hidden from view, both internal and external. In certain preferred embodiments the fixed pane conductive element is routed through a latch keeper and the sliding pane conductive element is routed through a latch base. For motor-driven or power sliding window assemblies which do not require a latch, the conductive elements may be substantially hidden from view by a base member mounted on the sliding pane and a keeper member mounted on the frame. Conductive elements may be positioned on the left and right sides of the sliding panes. Alternatively, all conductive elements may be routed through a latch (or a base member for power rear sliders) and an additional conductive element routed around the frame to a second fixed pane so that the side of the sliding pane nearest the second fixed pane is free of conductive elements.

From the foregoing disclosure and the following more detailed description of various preferred embodiments it will be apparent to those skilled in the art that the present invention provides a significant advance in the technology and art of sliding window assemblies. Particularly significant in this regard is the potential the invention affords for integrating heretofore separate technologies of sliding window assemblies and heating elements, and providing for and maintaining clear electrical connection between the sliding pane and the fixed panes. Additional features and advantages of various preferred embodiments will be better understood in view of the detailed description provided below.

Figure 1:
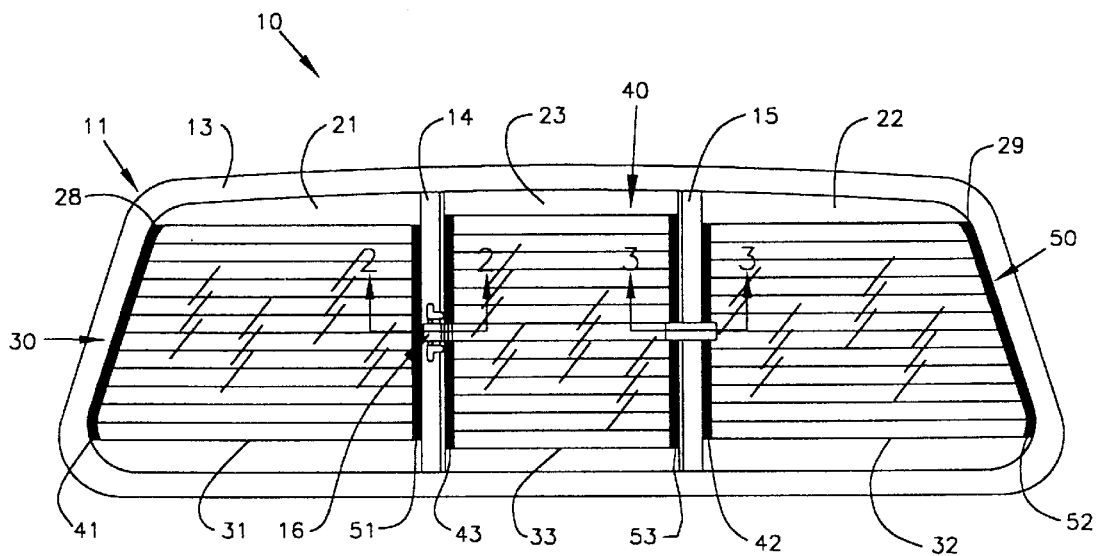
FIG. 1 is an elevation view of a heated sliding window assembly in accordance with a preferred embodiment.

It should be understood that the appended drawings are not necessarily to scale, presenting a somewhat simplified representation of various preferred features illustrative of the basic principles of the invention. The specific design features of the heated sliding window modules disclosed here, including, for example, the cross sectional thickness of the bus bars, the specific composition of the electrically conductive heating grid and conductive elements, and the design of the latch base will be determined in part by the particular intended application and use environment. Certain features of the illustrated embodiments have been enlarged or distorted relative to others to facilitate visualization and clear understanding. In particular, thin features may be thickened for clarity of illustration, as for example the electrically conductive heating elements. All references to direction and position, unless otherwise indicated, refer to the orientation of the window module illustrated in the drawings. In general, lateral or laterally refers to a rightward or leftward direction in the plane of the paper in FIG. 1, and up, down or vertical refers to corresponding directions in the plane of the paper in FIG. 1. The same reference numerals are used in the drawings to identify identical features of different preferred embodiments.

DETAILED DESCRIPTION OF CERTAIN PREFERRED EMBODIMENTS

It will be apparent to those skilled in the art, that is, to those who have knowledge or experience in this area of technology, that many design variations are possible for the heated sliding window assemblies disclosed here. The following detailed discussion of various alternative and preferred features and embodiments will illustrate the general principles of the invention with reference to a plastic glazing window module suitable for use in a motor vehicle. Other embodiments suitable for other applications will be apparent given the benefit of this disclosure.

Referring now to FIG. 1, a side view of a heated sliding window assembly 10 is shown in accordance with a preferred embodiment. The window assembly 10 comprises a manual rear slider 11 having a pair of fixed panes 21, 22 and a single sliding pane 23. The manual rear slider 11 has a circumferential frame 13 having post segments 14, 15 defining a central opening. The two fixed panes 21,22 may be attached to the frame by any of several known techniques, e.g., encapsulation with a plastic material around the periphery of the fixed panes or by use of an adhesive bonding the fixed panes to the frame 13. The sliding pane 23 slides laterally in upper and lower run channels (not shown) of the frame between an open position and a closed position where the sliding pane closes the central opening. For manual sliding windows a latch 16 mounted on the sliding pane secures the sliding pane to the frame at post segment 14.

Each pane has a corresponding heating grid 30, 40, 50. Heating grid 30 on the left fixed pane 21 comprises a series of heating wires or conductors 31 connected to bus bars 41 and 51. Similarly, heating grid 40 on the sliding pane comprises a series of heating wires or conductors 33 connected to bus bars 43 and 53; and heating grid 50 on the right fixed pane 22 has a series of wires or conductors 32 electrically connected to bus bars 42 and 52. The heating grids 30, 40, 50 may have sufficient electrically conductive metal content, such as copper or iron, that they carry an electric current, yet have sufficient electrical resistance that they generate heat to de-ice or de-fog the pane. The bus bars and the conductors may be applied to a surface of each pane, for example, by a silk-screening process. In certain alternative embodiments the heating grid may comprise a substantially transparent electrically resistive film, for example, a film or film stack deposited onto the surface of the plane by sputtering or other suitable method.

Figure 2:
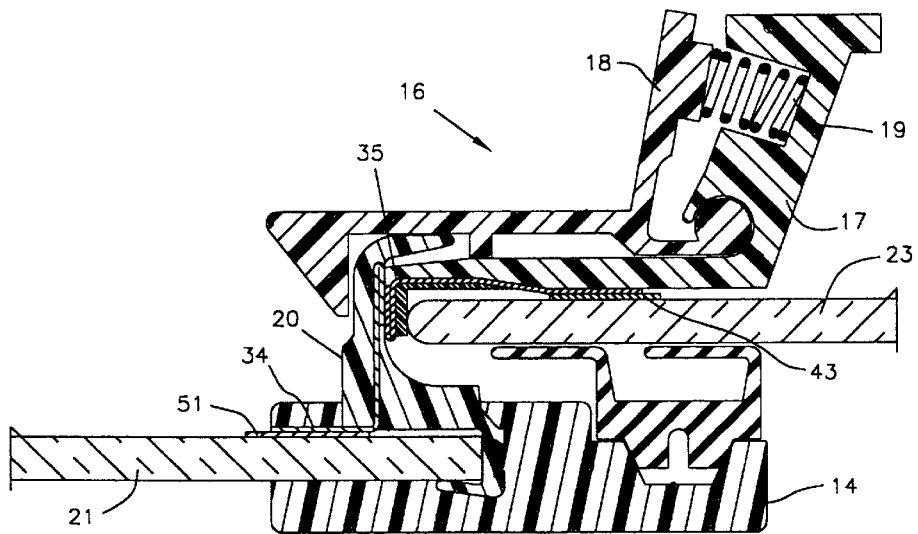
FIG. 2 is a cross section view partially broken away, taken along line 2—2 in FIG. 1, showing a sliding pane in a closed position with a latch keeper conductive element engaging a latch base conductive element at a first end of the sliding pane.

Terminals 28, 29 are attached to corresponding ones of the fixed panes 21, 22, at bus bars 41 and 52, respectively. A wire (not shown) is attached to each terminal, providing positive and negative electrical connections for the heated sliding window module. Preferably, the sliding pane must be in the closed position, where conductive elements (described below) can contact one another in order for electrical current to flow to the heating grids. FIG. 2 shows one preferred embodiment where the conductive elements meet at a latch 16. Latch 16 has a latch base 17 mounted on the sliding pane, a latch lever 18, pivotably mounted on the latch base 17 and biased by a spring 19 from an unlatching position toward a latching position. A first conductive element 34 is mounted on a latch keeper 20, and the latch keeper is in turn attached to fixed pane 21 or to post segment 14 of the frame. Preferably the latch 16 and latch keeper 20 are made of a nonconductive material. The first conductive element 34 is electrically connected to fixed pane heating grid 30 at bus bar 51, a second conductive element 35 is mounted on the latch base 17. The second conductive element 35 is electrically connected to the sliding pane heating grid 40 at bus bar 43. The bus bars may extend underneath both the latch keeper and the latch base. The conductive elements are typically a thin strip made of a metal which conducts electricity well, such as copper or beryllium. The conductive elements may be insert molded with the latch base and latch keeper, with projections extending for contact with the corresponding bus bars and conductive elements. Each conductive element can be electrically connected to a corresponding heating grid by soldering, for example.

Figure 3:
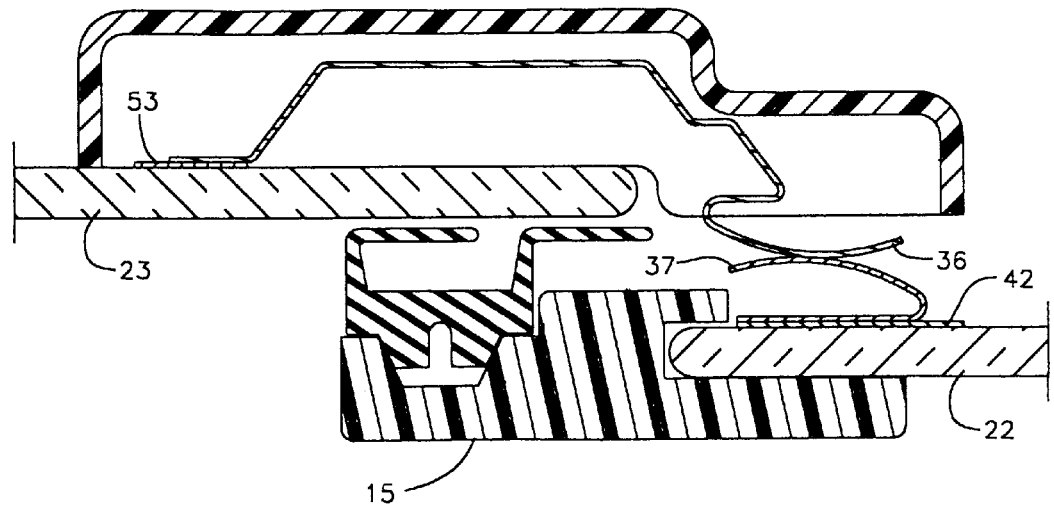
FIG. 3 is a cross section view taken along line 3—3 in FIG. 1, partially broken away, showing a conductive elements connected at the far end of the sliding pane to one of the fixed panes.

When the sliding pane 23 is in the closed position, as shown in FIG. 2, the first electrically conductive element 34 contacts the second electrically conductive element 35. As the sliding pane is slid to an open position, the circuit is broken since the electrically conductive elements 34, 35 no longer contact one another. FIG. 3 shows one preferred embodiment to complete the circuit between the fixed panes 21, 22 and the sliding pane 23 by using third and fourth conductive elements 36. 37 mounted on the far end of the sliding pane and post segment 15, respectively. The Third conductive element 36 is electrically connected to bus bar 53, and the fourth conductive element 37 is electrically connected to bus bar 42 on the fixed pane 22. Preferably the third conductive element 36 and fourth conductive element 37 are shaped with flexible bow shaped portions which contact one another and deflect as the sliding pane slides to the closed position, producing a wiping effect which helps to maintain proper electrical contact between the conductive elements. An operating control or switch, mounted on the dashboard (not shown) of a motor vehicle, allows electric current to flow from one common terminal to the fixed pane heating grids 30, 50 and the sliding range heating grid 40, advantageously heating both the sliding pane and the fixed panes. The different heating grids may be connected in series or in parallel.

Figure 4:
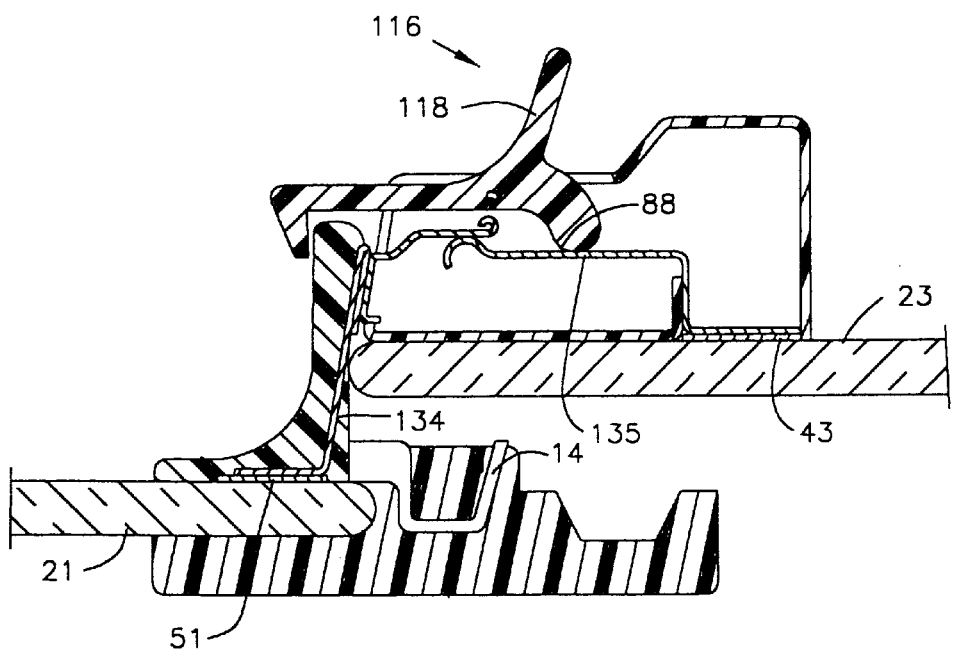
FIG. 4 is a cross section view of an alternative preferred embodiment corresponding to the view taken along line 2—2 in FIG. 1 showing an alternative latch with a cam for disengagement of the conducting elements.
Figure 5:
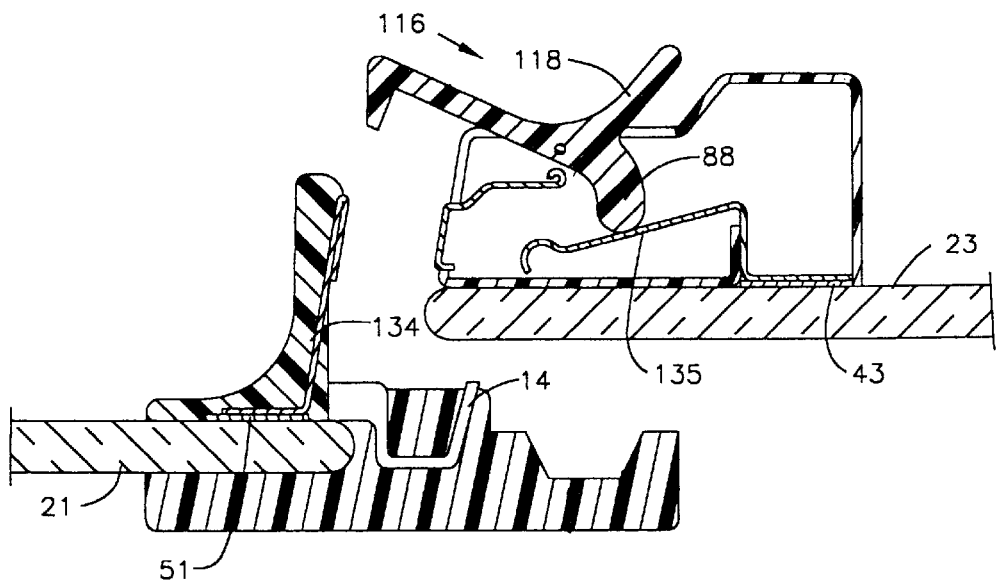
FIG. 5 is a cross section view of the preferred embodiment of FIG. 4 showing the latch in an unlatching position.

In certain preferred embodiments it can be desirable to ensure that arcing between conductive elements is reduced. FIGS. 4 and 5 show one such embodiment having a modified latch 116 where a cam 88 extends from latch lever 118. Preferably the cam 88 is made of non-conductive material. When the sliding pane is in the closed position, and the latch lever 118 is pivoted from a latching position (FIG. 4) to an un atching position (FIG. 5), cam 88 rotates down into contact with conductive element 135, urging conductive element 135 out of contact with fixed pane conductive element 134 before the sliding pane has moved from the closed position.

Figure 6:
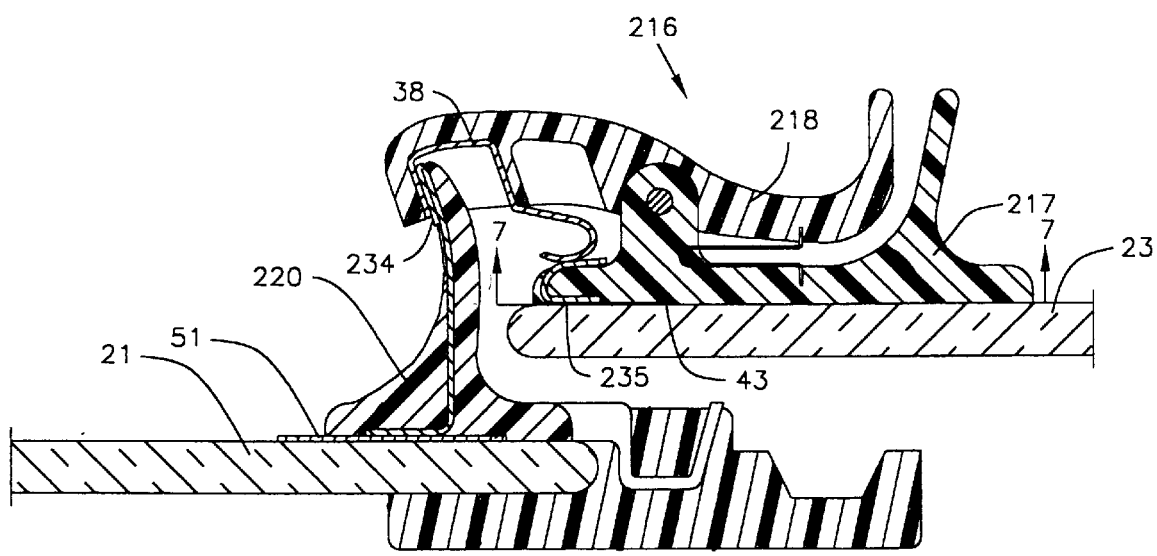
FIG. 6 is a cross section view partially broken away of an alternative preferred embodiment corresponding to the view taken along line 2—2 in FIG. 1, showing a conductive element which makes electrical contact with a wiping action, positioned on the latch.
Figure 7:
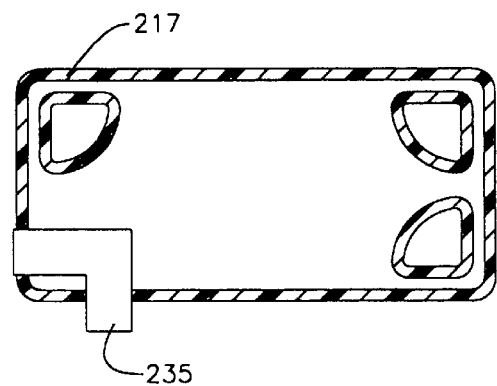
FIG. 7 is a cross section view partially broken away taken along line 7—7 in FIG. 6 showing the conductive element extending underneath the latch base so it can contact a bus bar.

FIGS. 6 and 7 shows an alternative preferred embodiment where the electrically conductive elements are hidden from internal view behind the latch lever 218 of latch 216 when in the closed position. A first conductive element 234 is positioned on post segment 14, extends along latch keeper 220, and is electrically connected to bus bar 51 on the fixed pane 21. A second conductive element 235 is positioned on the latch base 217, and is electrically connected with bus bar 43 on the sliding pane 23. As used here the phrase internal view means the view of the sliding window assembly from within a passenger compartment or the like, corresponding to both FIG. 1 and FIG. 8. In the embodiment shown in FIGS. 6–7, the second conductive element 235 is insert molded into the latch base and has a flange extending out of the latch base 217 into contact with the bus bar 43. A third conductive element 38 is attached to the latch lever 218, and electrically connects the first conductive element 234 to the second conductive element 235 when the sliding pane is the closed position and the latch lever is in the latching position. Preferably the third element 38 is shaped so that it makes wiping contact with the second conducting element 235 as the latch lever 218 moves between the latching and unlatching conditions, Other suitable electrically connecting conductive element arrangements with a latch and latch keeper will be readily apparent to those skilled in the art given the benefit of this disclosure.

Figure 8:
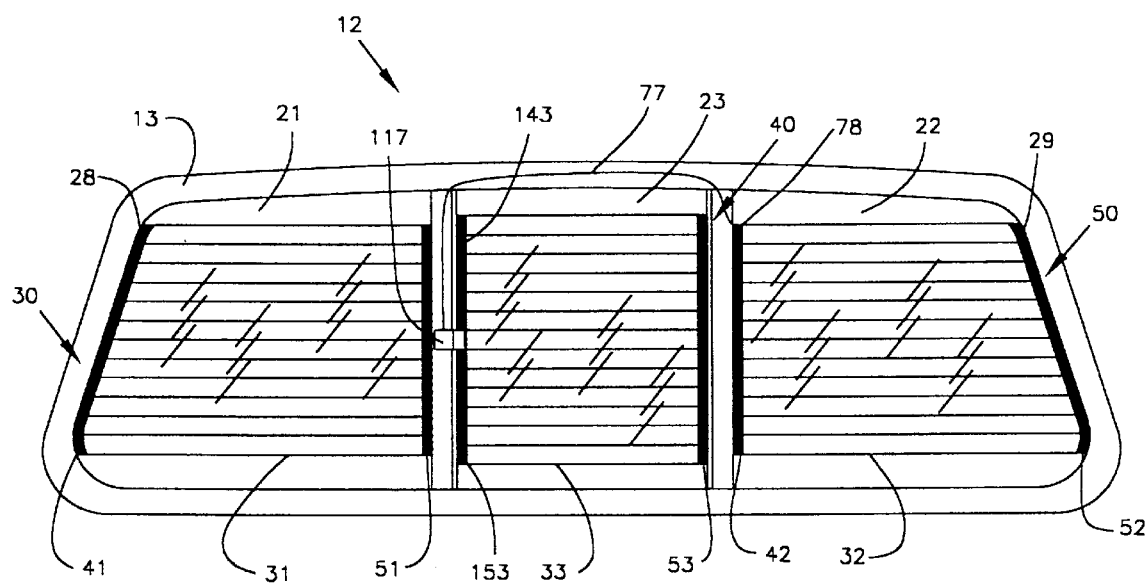
FIG. 8 is a side view of a power heated sliding window assembly in accordance with an alternative preferred embodiment.
Figure 9:
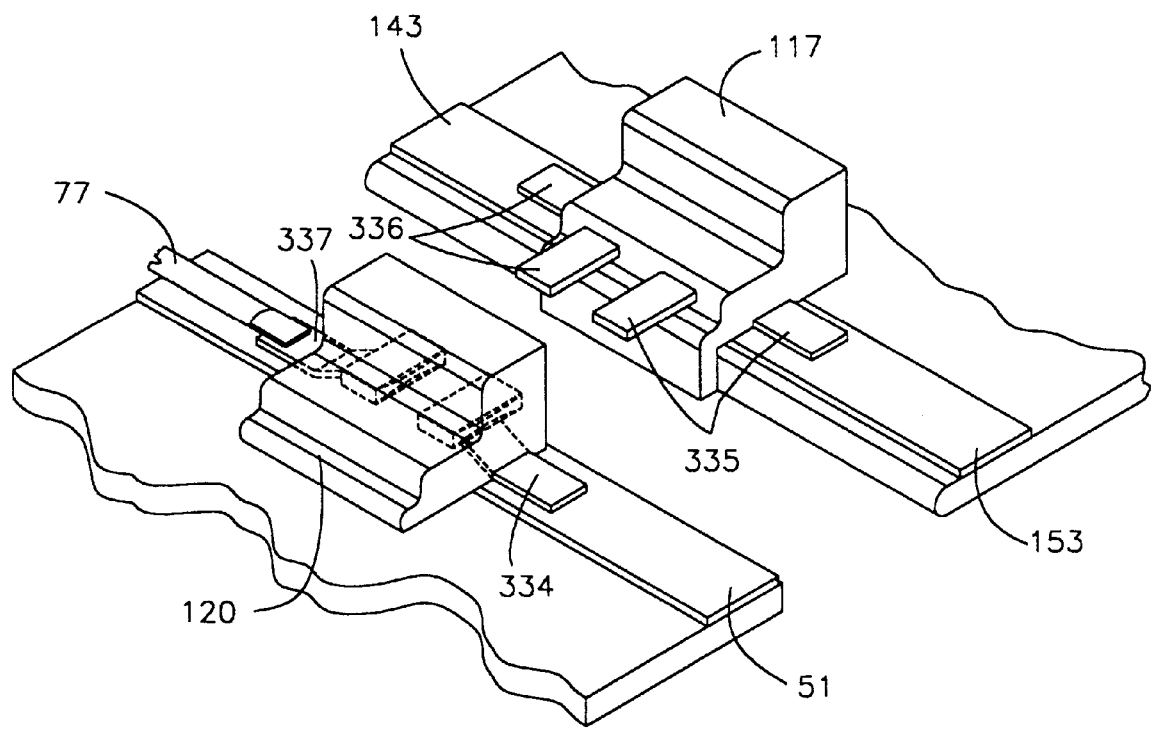
FIG. 9 is a fragmentary perspective view according to the embodiment of FIG. 8 showing the positive and negative electrical connections of FIG. 8 routed between the sliding pane and the fixed pane through the latch.

FIGS. 8 and 9 show an alternative preferred embodiment of a heated sliding window assembly. A power rear slider 12 is disclosed where a motor drives the sliding pane 23 between the open and closed positions. Sliding pane 23 has a heating grid 40 comprising a first bus bar 153 extending approximately half the height of the sliding pane upwardly to base 117, a second bus bar 53 on the far end of the sliding pane remote from the base 117 and a third bus bar 143 extending upwardly on the sliding pane from base 117.

Instead of routing a pair of conducting elements between the latch and latch keeper and a second pair of conducting elements at the opposite side of the sliding pane (i.e., remote from the latch) at post segment 15, all the conducting elements are routed through base 117 and keeper 120. A wire 77 or other suitable conductive element is routed between a terminal 78 on the second fixed pane 22 and one of the conductive elements mounted with the keeper 120. Thus the circuit is established without mounting electrical connecting componentry between the far side of the sliding pane 23 and the second fixed pane 22. One example of this routing is shown in FIG. 9, where a "plug-and-socket" circuit is disclosed. First conductive element 334 is mounted with the keeper 120 and is electrically connected to heating grid 30 at bus bar 51. Second conductive element 335 is mounted with the base 117 and is electrically connected to heating grid 40 at bus bar 153. The first conductive element forms a socket, and the second conductive element forms a plug which fits into the socket when the sliding pane is in the closed position. The socket conductive element 334 may have wiping contact with the plug conductive element 335. In similar fashion, the third conductive element 336 is mounted to the sliding pane 23 at base 117, the fourth conductive element 337 is mounted to the fixed pane at keeper 120, the third conductive element forms a plug and the fourth conductive element forms a corresponding socket.

When the circuit is closed, i.e., when the sliding pane is in its closed position, electric current is routed from the first heating grid 30 to the first conductive element 334, then to the second conductive element 335, then to the lower part of heating grid 40 to bus bar 153. From there, the current is routed back to the base through third conductive element 336 to fourth conductive element 337 to wire 77. The wire carries the electricity to fixed pane terminal 78 and from there to the rest of the sliding window assembly.

From the foregoing disclosure and detailed description of certain preferred embodiments, it will be readily apparent to those skilled in the art that various modifications, additions and other alternative embodiments are possible without departing from the true scope and spirit of the invention. For example, certain embodiments may use a single fixed pane and a single sliding pane. The arrangement of connective elements on the power rear slider embodiment may also be used on a manual rear slider. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A heated sliding window assembly comprising, in combination:
    a fixed portion comprising a circumferential frame and a fixed pane attached to the circumferential frame, the fixed pane having an electrically conductive heating grid;
    a sliding pane slidable within the circumferential frame between an open position and a closed position, the sliding pane having an electrically conductive heating grid;
    a first electrically conductive element mounted on the fixed portion; and
    a second electrically conductive element mounted on the sliding pane and electrically connected to the sliding pane heating grid, wherein the first and second electrically conductive elements are electrically connected when the sliding pane is in the closed position, and the first and second electrically conductive elements are not electrically connected when the sliding pane is in the open position.

2. The heated sliding window assembly of claim 1 wherein the fixed pane heating grid and the sliding pane heating grid are electrically connected in series.

3. The heated sliding window assembly of claim 1 wherein the second electrically conductive element makes wiping contact with the first electrically conductive element as the sliding pane slides from the open position to the closed position.

4. The heated sliding window assembly of claim 1 further comprising a third electrically conductive element mounted on the sliding pane, and a fourth electrically conductive element mounted to the fixed portion.

5. The heated sliding window assembly of claim 4 wherein the third electrically conductive element makes wiping contact with the fourth electrically conductive element as the sliding pane slides from the open position to the closed position.

6. The heated sliding window assembly of claim 1 further comprising a latch attached to the sliding pane for latching the sliding pane to the circumferential frame when the sliding pane is in the closed position, said latch comprising a latch base and a latch lever, the latch lever being pivotable between a latching position and an unlatching position.

7. The heated sliding window assembly of claim 6 wherein the latch lever has an electrically non-conductive cam and one of the first and second electrically conductive elements has a flexible portion flexible between a normal condition and a flexed condition, and pivoting of the latch lever from the latching position to the unlatching position rotates the cam, causing the cam to urge the flexible portion away from the normal condition.

8. The heated sliding window assembly of claim 7 wherein the first and second electrically conductive elements are in direct contact with one another when the sliding pane is in the closed position and the latch lever is in the latching position, and pivoting the latch lever to the unlatching position urges the first and second electrically conductive elements out of said direct contact with one another.

9. The heated sliding window assembly of claim 6 further comprising a latch spring biasing the latch lever toward the latching position.

10. The heated sliding window assembly of claim 1 wherein the first electrically conductive element is electrically connected to the fixed pane heating grid.

11. A heated sliding window assembly comprising, in combination:
   a frame having a circumferential segment and a pair of post segments which cooperate with the circumferential segment to define a left aperture, a right aperture, and a central aperture;
   a left fixed pane closing the left aperture, and having a left electrically conductive heating grid, and a right fixed pane closing the right aperture and having a right electrically conductive heating grid;
   a sliding pane having a left side and a right side, slidable within the frame between an open position and a closed position where the sliding pane closes the central aperture, and having an electrically conductive heating grid;
   a first electrically conductive element electrically connected to the left electrically conductive heating grid;
   a second electrically conductive element electrically connected to the sliding pane heating grid near the left side of the sliding pane;
   a third electrically conductive element electrically connected to the sliding pare heating grid near the right side of the sliding pane; and
   a fourth electrically conductive element electrically connected to the right electrically conductive heating grid;
   wherein when the sliding pane is in the closed position, the second electrically conductive element is electrically connected to the first electrically conductive element and the third electrically conductive element is electrically connected to the fourth electrically conductive element, and when the sliding pane is in the open position, the second electrically conductive element is not electrically connected to the first electrically conductive element and the third electrically conductive element is not electrically connected to the fourth electrically conductive element.

12. The heated sliding window assembly of claim 11 wherein each said heating grid comprises a series of thin heating elements and first and second bus bars, each said series of thin heating elements having a first end and a second end, and in each said heating grid the first bus bar is electrically connected to the first end and the second bus bar is electrically connected to the second end.

13. The heated sliding window assembly of claim 11 further comprising a latch mounted on the sliding pane, and a latch keeper mounted one of the post segments, the latch having a latch lever pivotable between a latching position and an unlatching position, and a latch base, the first electrically conductive element extends from the left electrically conductive heating grid to the latch keeper, the second electrically conductive element extends from the sliding pane heating grid to the latch base, and a fifth electrically conductive element is positioned on the latch lever and directly contacts both the first electrically conductive element and the second electrically conductive element when the sliding pane is in the closed position and the latch lever is in the latching position.

14. The heated sliding window assembly of claim 13 wherein the fifth electrically conductive element makes wiping contact with the second electrically conductive element as the latch lever pivots between the latching position and the unlatching position.

15. The heated sliding window assembly of claim 13 wherein the fifth electrically conductive element makes wiping contact with the first electrically conductive element as the latch lever pivots between the latching position and the unlatching position.

16. The heated sliding window assembly of claim 11 wherein the third electrically conductive element makes wiping contact with the fourth electrically conductive element as the sliding pane moves from the open position to the closed position.

17. The heated sliding window assembly of claim 11 further comprising means for connecting the heating grids to a power source comprising a positive terminal mounted on one of the fixed panes and a negative terminal mounted on the other of the fixed panes.

18. The heated sliding window assembly of claim 11 wherein the second and third electrically conductive elements are hidden from internal view by a latch lever.

19. A heated sliding window assembly comprising, in combination:
   a frame having a circumferential segment and a pair of post segments which cooperate with the circumferential segment to define a first aperture, a second aperture, and a center aperture;
   a first fixed pane attached to the circumferential segment and closing the first aperture, and a second fixed pane, closing the second aperture, the fixed panes each having a corresponding electrically conductive heating grid;
   a sliding pane having a first side adjacent the first fixed pane, slidable within the circumferential segment between an open position and a closed position where the sliding pane closes the center aperture, and having an electrically conductive heating grid;

a first electrically conductive element electrically connected to the first fixed pane heating grid;

a second electrically conductive element electrically connecting the sliding pane heating grid to the first electrically conductive element when the sliding pane is in the closed position, and not electrically connecting the sliding pane heating grid to the first electrically conductive element when the sliding pane is in the open position;

a third electrically conductive element electrically connected to the sliding pane heating grid near the first side of the sliding pane; and a fourth electrically conductive element electrically connecting the second fixed pane heating grid and the third electrically conductive element when the sliding pane is in the closed position and not connecting the second fixed pane heating grid to the third electrically conductive element when the sliding pane is in the open position.

20. The heated sliding window assembly of claim 19 wherein the second and third electrically conductive elements are attached to a base member, and the base member is attached adjacent to the first side of the sliding pane.

21. The heated sliding window assembly of claim 20 wherein the second electrically conductive element has a plug received by a socket of the first electrically conductive element when the sliding pane is in the closed position, and the third electrically conductive element has a plug received by a socket of the fourth electrically conductive element when the sliding pane is in the closed position.

22. A heated sliding window assembly comprising, in combination:

a fixed portion comprising a circumferential frame and a fixed pane attached to the circumferential frame, the fixed pane having an electrically conductive heating grid;

a sliding pane slidable within the circumferential frame between an open position and a closed position, the sliding pane having an electrically conductive heating grid;

a first electrically conductive element mounted on the fixed portion; and a second electrically conductive element mounted on the sliding pane and electrically connected to the sliding pane heating grid, wherein the first and second electrically conductive elements are electrically connected when the sliding pane is in the closed position and the second electrically conductive element makes wiping contact with the first electrically conductive element as the sliding pane slides from the open position to the closed position.

* * * * *